P. PETERSON.
AUTOMATIC FISHHOOK.
APPLICATION FILED NOV. 20, 1920.
1,388,058.
Patented Aug. 16, 1921.
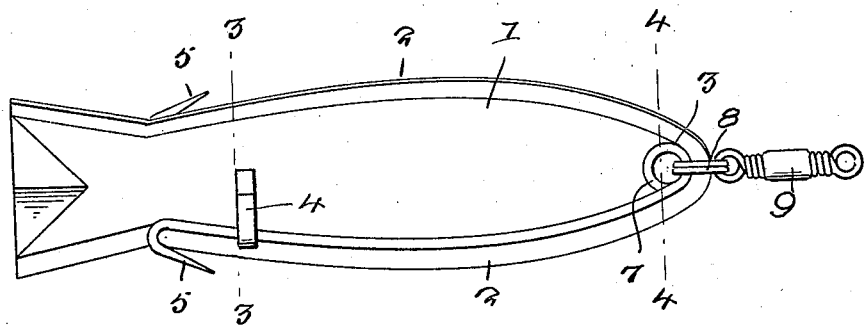
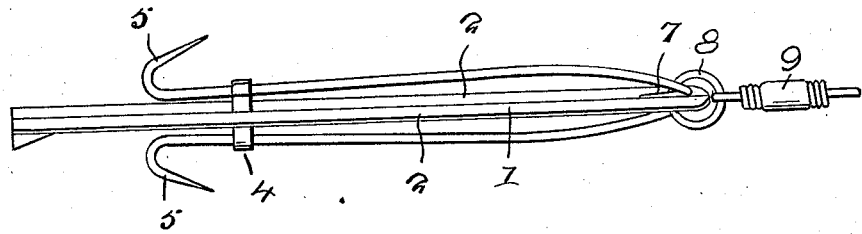
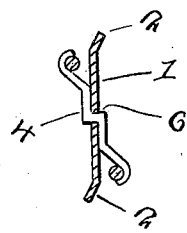 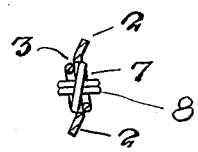 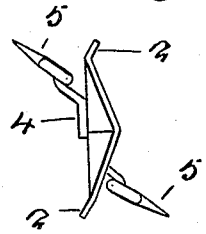
P. Peterson
INVENTOR
BY Victor J. Evans
ATTORNEY
WITNESS:

UNITED STATES PATENT OFFICE.

PAUL PETERSON, OF JUNEAU, TERRITORY OF ALASKA.

AUTOMATIC FISHHOOK.

1,388,058.  Specification of Letters Patent.  Patented Aug. 16, 1921.

Application filed November 20, 1920. Serial No. 425,425.

*To all whom it may concern:*

Be it known that I, PAUL PETERSON, a citizen of the United States, residing at Juneau, Territory of Alaska, have invented new and useful Improvements in Automatic Fishhooks, of which the following is a specification.

The object of my present invention is the provision of an efficient automatic fish hook characterized by the capacity of holding open the mouth of a hooked fish so that after being hooked the fish will be drowned and may be landed without difficulty.

To the attainment of the foregoing the invention consists in the improvement as hereinafter described and definitely claimed.

In the accompanying drawings, hereby made a part hereof:—

Figure 1 is a side elevation of the automatic fish hook constituting the best practical embodiment of my invention of which I am aware.

Fig. 2 is a plan view looking downwardly on the edge of the hook.

Fig. 3 is a transverse section taken in the plane indicated by the line 3—3 of Fig. 1.

Fig. 4 is a transverse section taken in the plane indicated by the line 4—4 of Fig. 1.

Fig. 5 is an elevation of the rear end of the hook body.

Similar numerals of reference designate corresponding parts in all of the views of the drawings.

Among other elements my novel hook comprises a body 1. The said body 1 is preferably, though not necessarily, made in the form illustrated so as to simulate a fish and serve as a lure. I would also have it understood that I prefer to provide the body 1 with reversely arranged side flanges 2 and to shape the rear end of the body as shown so that when moved in the water the body will acquire a darting and wiggling motion in simulation of a moving fish. In the forward portion of the body 1 is a transverse aperture 3.

In addition to the body 1 the hook comprises a retainer 4, and hook members 5. The retainer 4 in the present and preferred embodiment of my invention is shaped as illustrated and is extended through the transverse aperture 6 in the body 1. It will also be noticed in this connection that the hooks at the ends of the retainer 4 are reversely arranged. The hook members 5 are joined through the medium of a spring coil 7 of a size to enter and snugly fit the aperture 3 in the body.

I illustrate in association with the automatic hook an eye 8 that receives the coil 7 and the forward end of the body 1, and I also show a swivel member 9 for effecting connection of a line to the said eye 8.

In order to set my novel hook the operator places the spring coil 7 in the aperture 3 of the body 1 and holds the spring coil 7 between the thumb and the fore finger of the left hand. Then with the tail portion of the body 1 toward the right the operator engages the upper hook member 5 with the upper hook of the retainer 4. With this done the operator presses the lower hook member against some hard object until the lower hook member is engaged and held in the lower hook of the retainer 4 when the hook will be completely set. In this connection it will be noticed that the spring coil 7 is capable of locking itself in the aperture 3 of the body 1.

When my novel automatic hook is moved in the water and a fish takes the bait, the engagement of the pointed ends of the hook members 5 in the jaws of the fish will result in the hook members being released from the retainer 4, whereupon the hook members 5 will spring outwardly in opposite directions and in so doing will open the mouth of the fish and hold the mouth open so that the fish will be quickly drowned.

Having described my invention, what I claim and desire to secure by Letters-Patent, is:—

1. An automatic fish hook comprising a body having an aperture adjacent to its forward end and also having an aperture adjacent to its rear portion, a retainer extending through the latter aperture of the body and having reversely arranged hooks at its ends, and resilient hook members adapted for removable arrangement in the hooks of the retainer and connected together and with the body by means adapted to rest in the forward aperture of the body.

2. An automatic fish hook comprising a body having a transverse aperture adjacent to its rear portion, a retainer extending through the aperture and carried by the body and bearing against opposite sides thereof and having reversely arranged hooks spaced from the sides of the body, and resilient hook members associated with and arranged at opposite sides of the body and connected together and with the body by means adapted to rest in the forward aperture of the body and detachably engaged with hooks of the retainer and tending when disengaged from said retainer hooks to spring in opposite directions and thereby force and hold the mouth of a fish open.

In testimony whereof I affix my signature.

PAUL PETERSON.